United States Patent [19]

Kwan et al.

[11] Patent Number: 6,024,789
[45] Date of Patent: Feb. 15, 2000

[54] METHOD OF PREPARING IRON-CONTAINING PIGMENT WITH ENHANCED DISPERSIBILITY IN BOTH POLAR AND NONPOLAR SOLVENTS

[75] Inventors: Wing Sum Vincent Kwan, Deerfield; Yoshikazu Mizobuchi, Mundelein, both of Ill.

[73] Assignee: Videojet Systems International, Inc., Wood Dale, Ill.

[21] Appl. No.: 09/075,084

[22] Filed: May 7, 1998

[51] Int. Cl.$^7$ ........................................ C07C 3/08
[52] U.S. Cl. ................... 106/460; 106/456; 106/148.5; 106/148.1; 106/503; 427/220
[58] Field of Search ................... 106/460, 456, 106/148.5, 148.1, 503; 427/220; 428/403, 407, 404

[56] References Cited

U.S. PATENT DOCUMENTS

| | | | |
|---|---|---|---|
| 4,126,591 | 11/1978 | Kronstein et al. | 106/503 |
| 4,165,239 | 8/1979 | Linden et al. | 106/300 |
| 4,622,074 | 11/1986 | Miyoshi et al. | 106/503 |
| 5,486,233 | 1/1996 | Mitchell et al. | 106/460 |
| 5,718,755 | 2/1998 | Kohler et al. | 106/456 |
| 5,849,074 | 12/1998 | Kwan | 106/460 |
| 5,855,661 | 1/1999 | Kwan | 106/460 |
| 5,865,885 | 2/1999 | Kwan | 106/460 |
| 5,922,121 | 7/1999 | Kwan | 106/460 |

FOREIGN PATENT DOCUMENTS

0699721A2  6/1996  European Pat. Off. .

*Primary Examiner*—C. Melissa Koslow
*Attorney, Agent, or Firm*—Leydig, Voit & Mayer, Ltd.

[57] ABSTRACT

Modified iron-containing pigment particles modified with an encapsulant comprising an alkylphenol and lecithin having an HLB value from about 10 to about 15. The modified iron oxide pigments made using the encapsulant exhibit enhanced dispersibility in solvents over a wide range of polarity.

7 Claims, No Drawings

6,024,789

METHOD OF PREPARING IRON-CONTAINING PIGMENT WITH ENHANCED DISPERSIBILITY IN BOTH POLAR AND NONPOLAR SOLVENTS

FIELD OF THE INVENTION

The present invention relates generally to the field of pigments. More specifically, the present invention is directed towards a method of treating iron-containing pigment particles to render them more dispersible in both polar and nonpolar solvents.

BACKGROUND OF THE INVENTION

Iron oxide pigments are used in many, various industrial applications that involve solvents and media spanning the whole spectrum of polarity, from highly polar to nonpolar. For instance, red iron oxide pigments are used in concrete, which uses a polar media, water. Iron oxide pigments are also used in solvent-based coatings that use low-polarity solvents, such as toluene. Iron oxides are inherently hydrophilic. Consequently, they disperse fairly well in polar media. However, when they are used in nonpblar systems, surfactants or dispersants must be added to aid in the wetting and dispersion process. Such surfactants may cause problems in the formulation. In some industrial applications the hydrophilic pigment must be dispersed in a nonpolar medium, without the use of surfactants, such as when yellow iron oxide is used in certain plastic formulations. In such an instance, the yellow iron oxide must be "dry-milled" with the polymer matrix. The use of surfactants to aid in dispersing the iron oxide is impractical in that application.

Although iron oxide is the most consumed inorganic colorant, most commonly used dispersants are tailored to render the iron oxide either more hydrophilic (using silicate, aluminum hydroxide, sodium phosphates, or a mixture of aminoalcohols or their salts) or hydrophobic (using fatty acid alkanolamide esters, polycarbonate/polyurethane polymer, alkali siliconate silylalkylphosphate, dodecylbenzenesulphonates, or metal salts). Very few attempts have been made to produce a universally dispersible iron oxide pigment that is capable of being dispersed equally well in both polar and nonpolar media.

Where attempts have been made to render iron oxide universally dispersible, it usually has been by the use of post-production processing. Such an approach usually involves a redispersion of the dried pigment or presscake in water, followed by the addition of a desired concentration of a surfactant or a combination of two or more surfactants (one surfactant being useful in polar media and the other in nonpolar media). U.S. Pat. No. 4,165,239 discloses a process for treating iron oxide with carboxylic acid esters of tertiary alkylolamines to improve the dispersibility in organic and aqueous media. Japanese published application JP-94/232177 describes a process of coating inorganic pigments with modified polysiloxane to enhance the dispersibility in different media, but does not teach the use of single modified polysiloxane as being sufficient to enhance the dispersibility in both organic and aqueous media.

To the extent that universal dispersibility for certain pigments has been achieved by the use of such redispersion methods, such methods have added tremendous labor cost to the production of such pigments. Moreover, the addition of complex, expensive surfactants or dispersants has further raised the cost to produce such pigments.

Thus, a need exists for a fast, simple and economical way to prepare a universally dispersible pigment so that pigment particles may be easily dispersed in both polar and nonpolar solvents.

SUMMARY OF THE INVENTION

In accordance with the present invention, a slurry of iron-containing pigment particles is contacted with a specially formulated encapsulant.

The present invention provides an encapsulant formulation comprising an alkylphenol and lecithin having a specific HLB value. The encapsulant is used in a non-invasive manner to modify iron oxide in the slurry form. The modified iron oxide pigments made using the encapsulant exhibit enhanced dispersibility in solvents over a wide range of polarity. This is in great contrast with the prior art in that pigments are usually modified by dispersants which are tailored either to polar or nonpolar solvents and not both. Iron oxides that are modified in accordance with the present invention are expected to reduce processing time and hence labor cost in coating formulations.

In accordance with the present invention, the encapsulant is allowed to contact iron-containing pigment particles, resulting in pigment particles with enhanced dispersibility in both polar and nonpolar media.

The pigment particles thus modified by the encapsulant may be recovered by conventional means, such as by filtration, and dried to obtain dry modified pigment particles, if desired. The modified pigment particles can then be dispersed in a wide range of solvents or vehicles, as by first adding a desired solvent or vehicle to the dry modified pigment particles to make a pigment concentrate, and then dispersing the pigment concentrate in the solvent or vehicle of choice.

The modified pigment particles disperse easily in a wide variety of solvents and vehicles, and provide stable, dispersions having a small mean pigment particle size and narrow particle size distribution. Typically the median particle size will be up to about one micron.

Usually, the method of preparing modified iron-containing pigment particles in accordance with the present invention will comprise:

(a) preparing a slurry of iron-containing pigment particles, such that the pigment particles are present in an amount from 10% to 50% by weight of the slurry;

(b) adding an encapsulant comprising an alkylphenol and a lecithin having an HLB value from about 10 to about 15, usually in an amount from about 5 to about 20%, by weight of the pigment particles;

(c) mixing the encapsulant into the slurry to obtain modified pigment particles; and (e) optionally recovering and optionally drying the modified pigment particles.

The resulting pigment particles may be used to prepare a pigment concentrate by adding a vehicle to the modified pigment particles. A pigment dispersion may be made from the concentrate by dispersing the concentrate in one or more solvents.

DESCRIPTION OF THE PREFERRED EMBODIMENTS

Specification of Encapsulant

The encapsulant employed in accordance with the present invention comprises an alkylphenol and a lecithin. Although the term "encapsulant" is used, it is not deemed necessary for the encapsulant to completely encapsulate the iron-containing pigment, although that may be desired in some instances.

Alkylphenol compounds used in the encapsulant comprise a family of compounds in which an alkyl "tail" is added to phenol. Nonylphenols, such as (4-nonyl) phenol and (2,4-dinonyl)phenol are preferred among the alkylphenol compounds. These compounds have one or two nine-carbon alkyl tails, respectively. Other isomers of nonylphenol, including those having a ranched tail, and including other positional isomers, ay be used, as may mixtures of alkylphenol compounds or isomers. Additional alkylphenol compounds suitable for use with the methods of the present invention include, for example, compounds with shorter tails, such as pentylphenol and hexylphenol, and those with longer tails, such as decylphenol, undecylphenol, dodecylphenol, and so forth. In general, longer tails are preferred; however, nonylphenol is the preferred compound of the alkylphenol compounds, inasmuch as it is inexpensive and widely commercially available. A particularly preferred nonylphenol mixture is that available under the designation Product No. 29085-8 from Aldrich Chemical Co. Inc., Milwaukee, Wis. This product comprises a mixture of isomers of nonylphenol. It is believed that the alkylphenol attaches to the surface of the pigment, hence providing adsorption sites for the lecithin. The percentage of the alkylphenol in the encapsulant is less than 10% by weight, preferably from about 0.1 to about 5 percent. A suitable dinonylphenol is provided by Huntsman Corporation (Houston, Tex.).

In contrast to the lecithins used in the prior art, for purposes of encapsulating pigment particles, the lecithin used in the encapsulant in accordance with the present invention has a hydrophilicity-lipophilicity balance (HLB) value of about 10 to about 15, preferably in the range from about 10 to about 12. A suitable lecithin is LP250, manufactured by Central Soya (Fort Wayne, Ind.).

The weight of such lecithin in the encapsulant usually is from about 80 percent to about 99.9 percent, by weight, and preferably is in the range from about 95 to about 99.9 percent.

The dosage of the encapsulant to the pigment depends on the surface area, porosity, and surface characteristics of the pigment involved. In general, a dosage of less than about 20% by weight of the pigment particles, and usually from about 1 to about 10 percent is sufficient. The preferable range typically is from about 4 to about 10 percent, depending on the final application.

Although it usually is more convenient to pre-mix the two components of the encapsulant before application, such is not required. As an alternate process, the individual components may be applied sequentially. Thus, for example, alkylphenol may be added first, followed by lecithin.

Moreover, due to the unique interaction between the encapsulant and the pigment surface, such encapsulant is expected to impart chemical and heat resistance to the specified substrate.

Specification of Pigment

Any iron-containing pigment or metal particles can be used in accordance with the present invention. The iron-containing pigments include, but are not limited to, iron oxide, iron-containing complexes and metallic iron particles. The iron oxide may include black, yellow, and red iron oxide, as well as magnetic and non-magnetic iron oxides, such as black and brown iron oxide. Further the iron oxide may be of different shapes, including but not limited to, acicular, spheroidal, and cubical iron oxide. Also useful in the present invention are metal ferrites, such as manganese ferrite and zinc ferrite.

Specification of the Slurry

The slurry may be prepared by either dispersing a dry powder or a washed wet presscake in water. Preferably the pigment is obtained directly from the production line at the end of the precipitation process. In that case, redispersion becomes unnecessary and hence the high cost of labor in such post-production processing may be avoided.

Moreover, as alkylphenol has strong affinity for the surface of iron-containing pigments, the surface modification step may be very selective and may take place efficiently even in the presence of other interfering substances. In actual practice, the encapsulant may be added directly into the reactor mixture after the precipitation process is completed. This is in contrast to the prior art in which the pigment must be isolated from the interfering materials first before the modification.

Typically, the encapsulant is mixed into the slurry at a temperature from about 50° C. to about 70° C. The time of contact is normally less than 30 minutes, preferably from about 1 to about 10 minutes. Of course, if the mixing efficiency is low (due to lower stirring speed or inefficient stirrer configuration), the required contact time will be longer.

Recovery, if desired, may be by means of filtration or other suitable means. The recovered, modified pigment particles may then be washed and dried.

The aqueous slurry should contain pigment particles in an amount from about 5% up to about 50%, by weight of the slurry. Preferably, the slurry should contain from about 5% to about 30% by weight of pigment particles.

As indicated, the slurry that is employed in accordance with the present invention may be that obtained in the manufacturing process for the pigment. The desired aqueous slurry, however, can be prepared by redispersing a presscake or even dry pigment powder into water. It is preferred not to use dry pigment, if possible, as the dried pigment may already contain irreversible agglomeration.

After the slurry is formed, the encapsulant should be added, and the resulting mixture should be stirred for a time sufficient to contact the encapsulant with the pigment particles. Such contact occurs more quickly under the influence of heat. Therefore, it is preferred that the slurry be heated, prior to, during, or after the addition of the encapsulant, and that the mixture of pigment and encapsulant be stirred under the influence of heat. Although the temperature in this step is not critical, it should be below the temperature at which degradation of the pigment occurs. The temperature and time required in any particular situation will vary depending upon the particular pigment and encapsulant that is used.

After the encapsulant has been added, and the solution stirred sufficiently to contact the encapsulant with the pigment particles, the solution, if it has been heated, may be cooled if desired, and filtered, if necessary, by conventional means, to obtain wet modified pigment particles. These wet modified particles may then be washed with water, preferably deionized water, and dried by conventional means, to obtain dry modified pigment particles. These particles then can be dispersed into a solvent system to create a pigment dispersion. Such dispersions may be prepared as described below. Of course, other means for recovering the pigment may be employed, such as sedimentation, decantation and spray-drying. Further, wet pigment may be otherwise treated to remove water, as by contact with organic solvents that are miscible with water, or the like.

FORMATION OF THE INK OR DISPERSION

The modified pigment can be mixed with any desired vehicle to obtain a pigment concentrate, which can then be dispersed in various solvent systems, to create a pigment dispersion. These pigment dispersions find uses in inks, including but not limited to solid-based, solvent based or solid material-based inks; coatings, including but not limited to paints; colorants, including but not limited to color toners, and all other applications which demand a dispersion of such pigment particles in a medium, such as the use of such a dispersion in flat-screen display devices.

Typically, the modified pigment first is mixed with a vehicle compatible with the solvent system in which the pigment will be dispersed, such as varnish, to form a pigment concentrate. Suitable vehicles include LV-1830, available from the Lawter Company (Northbrook, Ill.), MVFG-380, available from the Walsh Company (Newark N.J.), and Shellac R-49, available from the Mantrose-Bradshaw-Zinsser Group (Westport, Conn.). The vehicle preferably is added in an amount sufficient to obtain a ratio of modified pigment to vehicle of about 1:0.8 by weight or less. Most preferably the ratio of pigment particle to vehicle will be about 2.6 or less, by weight.

The pigment concentrate can then be dispersed in various solvent systems. Useful solvent systems include aqueous systems; aromatic solvents, such as toluene and xylene; aliphatic solvents, such as hexane; halogenated hydrocarbons, such as methylene chloride and chloroform; aromatic oils, such as Tuffo 2000, an aromatic oil, available from EMCO Chemical Distributor (Chicago, Ill.); aliphatic oils, such as Magie 47 and Magie 52, both available from the Walsh Company; glycol ethers, such as propylene glycol n-propyl ether (PnP) and dipropylene glycol n-propyl ether (DpnP)(Both PnP and DpnP are from Dow Chemical Co., Midland, Mich.); esters, such as ethyl acetate; and ketones, such as methylethylketone and acetone; as well as solvent systems comprising two or more of the above solvents.

Evaluation of Dispersibility

Dispersibility may be evaluated by two methods—settling or sedimentation speed of a pigment dispersion and the fineness of grind of a coating using such pigment. Below is a description of both methods.

The first method is a measurement of sedimentation speed. This method takes advantage of the fact that a poorly dispersed pigment will tend to agglomerate and settle quickly. In short, a pigment dispersion is prepared and allowed to settle. As the pigment starts to settle, a clear supernatant will appear. The rate of sedimentation can then be inferred by either measuring the rate of the decrease of pigment level, or the rate of increase in the thickness of the clear supernatant layer. The latter is chosen in accordance with the present invention, and is reported in unit of centimeter per unit time. Pigment of good dispersibility will give rise to a stable pigment suspension and hence a small rate of clearing in supernatant. Conversely, a pigment that is difficult to disperse will give rise to unstable suspension and hence a large rate of clearing in supernatant. Ideally, a pigment that is well dispersed in polar and nonpolar media should exhibit zero rate of supernatant clearing in both media. In reality, this rate will be small and approaches zero.

In order to truly test the dispersibility of the pigment, pure solvents without any binder were used in the sedimentation rate experiment. Four solvents have been chosen to cover the whole spectrum of polarity. Water is used as the representative for the polar solvent. Propylacetate is used as the medium at intermediate polarity and cyclohexane is used as the non-polar counterpart. Toluene is also included in this study. Although toluene has a slight dipole moment, it is so commonly used as solvent that it was considered appropriate to be included in the study.

The present invention will be further illustrated by the following nonlimiting examples.

EXAMPLE b 1A 286 grams of a slurry (pigment content=8%) of yellow iron oxide was heated to 50° C. With efficient stirring, 1.14 grams of encapsulant (5% dinonylphenol in LP250, HLB=12) was added to the mixture. Stirring was maintained for another ten minutes. The pigment was then filtered using a Buchner funnel with Whatman #1 filter paper, washed and dried in a convection oven overnight. The pigment was pulverized using a coffee mill before testing for dispersibility.

EXAMPLE 1B 280 grams of a slurry (pigment content=17.4%) of red oxide was heated to 50° C. With efficient stirring, 4.29 grams of encapsulant (5% dinonylphenol in LP 250, HLB=12) was added to the mixture. The dosage of encapsulant was 8.8% by weight. Stirring was maintained for another ten minutes. The pigment was then filtered using a Buchner funnel with Whatman #1 filter paper, washed and dried in a convection oven overnight. The pigment was pulverized using a coffee mill before testing for dispersibility.

EXAMPLE 2

Each of the two centrifugal tubes (15 cc) was first filled with 9 cc of water. To one tube was added 0.5 grams of control pigment, and to the other was added 0.5 grams of surface modified pigment (from Example 1A and 1B). The tubes were capped and violently shaken. They were then allowed to stand and the thickness of supernatant was determined over a designated period of time.

EXAMPLE 3

The procedures in Example 2 were followed except that toluene was used as the medium in the tubes.

EXAMPLE 4

The procedures in Example 2 were followed except that propylacetate was used as the medium in the tubes.

EXAMPLE 5

The procedures in Example 2 were followed except that cyclohexane was used as the medium in the tubes.

TABLE 1

Comparison of the sedimentation rates of suspensions of two iron oxides with and without surface modification in water, propylacetate and toluene (Note 1).

| | Yellow Iron Oxide | | Red Iron Oxide | |
|---|---|---|---|---|
| | Control | Modified | Control | Modified |
| Water | 1.4 | 0.0 | 15.9 | 0.0 |
| Toluene | 108 | 1.9 | 1,080 | 13.8 |
| Propyl acetate | 1.3 | 0.6 | 300 | 57.0 |
| Cyclohexane | 75 | 0.1 | 1,060 | 0.1 |

Note 1. The rate of sedimentation was measured as the rate of increase in the thickness of clear supernatant, and is reported in cm per hour. Greater values denote unstable suspension, hence inferring poor dispersibility.

Two observations may be made from the results in Table 1. First, as indicated by the small or zero rate of sedimentation (except in the case of dispersion of red iron oxide in propyl acetate), iron oxides modified by this formulation of encapsulant can be dispersed in both polar and nonpolar solvents. This contrasts greatly with similar formulations in the prior art in that those formulations can allow the pigment to be dispersed in either polar or non-polar solvents, but not both.

Second, the drastic difference in sedimentation rates between the modified and the control pigments has demonstrated the effectiveness of the encapsulant in enhancing dispersibility of the pigment, and consequently the stability of the whole pigment suspension. In essence, without such an encapsulant, the iron oxide will begin to settle once the shaking process is completed.

Examples 2–5 represent the worst-case scenario in that no supporting binder has been used to suspend the pigment in the solvent. In reality, the sedimentation rate of modified pigment in actual commercial formulations should be even smaller than shown above.

Another way to determine dispersibility of pigment is by the fineness of grind test. In essence, a pigment is first dispersed into a binder resin system using means of dispersion like a Cowles mixer or a Red Devil shaker. The dispersed mixture is removed periodically and tested on a fineness of grind gauge. The fineness of grind gauge is an equipment designed to measure the presence of oversized, nondispersed particles. The dispersion process is usually continued until the mixture shows no oversized particles greater than 12 microns on the fineness of grind gauge. The time of dispersion to achieve that degree of fineness is inversely proportional to the ease of dispersion for the pigment.

A pigment that is easy to disperse exhibits shorter dispersion time to achieve the same fineness of grind reading. A detailed procedure to use such technique in evaluating these pigments is described in Example 7, and the results for yellow iron oxide and red iron oxide as representative examples are tabulated in Table 2 and Table 3 respectively.

EXAMPLE 7

Five grams of the pigment (surface modified at 5%, w/w) were added to 45 grams of a varnish. The mixture was stirred at 1500–1700 rpm using a high speed mixer (Premier Mixer Model 90) equipped with a 1.5 inches blade. Mixture was sampled at 1, 2, 3, and 5 minutes during the mixing process and tested on the fineness of grind gauge (Hegman Gauge). The time of dispersion to reach a Hegman reading of 7 (meaning that there are no oversized, nondispersed particles greater than 12 microns) was noted and reported in Table 2.

For the polar systems, an acrylic flexo varnish AP 9055 (Lawter International, Northbrook, Ill.) was used. To access dispersibility in non-polar systems, Beckosol (Reichhold Chemicals, Inc., Research Triangle Park, N.C.) was applied. The experiment was repeated on the control pigment to access the effect of surface modification.

EXAMPLE 8

The same procedure as in Example 7 was adopted except that red iron oxide (surface modified at 8%, w/w) was used as the pigment and Joncryl 62 (S. C. Johnson & Son, Racine, Wis.) was used as the polar varnish for the dispersion test.

TABLE 2

Comparison of dispersion time between unmodified and surface modified yellow iron oxide in polar and non-polar varnish systems (Note 1).

| | AP 9055 (Polar) | |
| --- | --- | --- |
| | Control | Modified |
| Dispersion Time (min.) | 5 | 2 |
| | Beckosol (Non-polar) | |
| | Control | Modified |
| Dispersion Time (min.) | 1 | 0.5 |

Note 1. Five grams of the pigment were added to 45 grams of a varnish. The mixture was stirred at 1500/1700 rpm using a high speed mixer (Premier Mixer Model 90) equipped with a 1.5 inches blade. The mixture was sampled at 1, 2, 3, and 5 minutes (except for yellow iron oxide) during the mixing process and tested on the fineness of grind gauge (Hegman Gauge). The time of dispersion to reach a Hegman reading of 7 (meaning that there are no oversized, nondispersed particles greater than 12 microns) was reported.

TABLE 3

Comparison of dispersion time between nonmodified and surface modified red iron oxide in polar and non-polar varnish systems (Note 1).

| | Joncryl 62 (Polar) | |
| --- | --- | --- |
| | Control | Modified |
| Dispersion Time (min.) | >5 (Note 2) | 2 |
| | Beckosol (Non-polar) | |
| | Control | Modified |
| Dispersion Time (min.) | >5 (Note 2) | 3 |

Note 1. Five grams of the pigment were added to 45 grams of a varnish. The mixture was stirred at 1500/1700 rpm using a high speed mixer (Premier Mixer Model 90) equipped with a 1.5 inch blade. The mixture was sampled at 1, 2, 3, and 5 minutes (except for yellow iron oxide) during the mixing process and tested on the fineness of grind gauge (Hegman Gauge). The time of dispersion to reach a Hegman reading of 7 (meaning that there are no oversized, nondispersed particles greater than 12 microns) was reported.
Note 2. The Hegman gauge reading still reinained at 0 for the polar system and 2 for non-polar system after 5 minutes of high speed dispersion.

The data in both tables demonstrate clearly that surface modification using such encapsulant increase the dispersibility of both iron oxide in polar and non-polar media over the non-modified pigment. The enhancement in dispersibility in both solvents is seen to be greater in the case of red iron oxide than in yellow iron oxide. This is very important in that among all of the different colored iron oxide, red iron oxide is the most used commercially.

Although lecithin has been used in conjunction with alkylphenol in the prior art to improve dispersibility in nonpolar solvent systems, those lecithins with a lower HLB value (less than 10) cannot be used to produce a universally dispersible pigment. To demonstrate the differentiation from the prior art, a red iron oxide was prepared with the same formulation as in Example 6, with the only difference being in the HLB value of the lecithin (Example 9). The modified pigment was then subjected to sedimentation test (as set forth in Example 2) and fineness of grind test (as set forth in Example 7). The results are tabulated in Table 4 and Table 5 respectively.

EXAMPLE 9 (Comparative)

A similar procedure was followed as in Example 6 except that an encapsulant comprising of 5% (w/w) dinonylphenol and 95% (w/w) of Blendmax K (Central Soya Company, Lafayette, Ind.) with a HLB value of 7 was used.

As shown in both Tables 4 and 5, red iron oxide modified with a lecithin with a low HLB value of 7 exhibited a higher sedimentation rate and a longer time of dispersion. Both observations are indications of lower dispersibility. This clearly demonstrates the important of using a lecithin of higher HLB value (>10) in this application.

In order to optimize the performance of the encapsulant, the ratio between lecithin and alkylphenol in the encapsulant was also varied (Example 10) The sedimentation rate evaluation was performed on these pigments and the results are tabulated in Table 6.

TABLE 4

Comparison of the sedimentation rates of suspensions of two red iron oxides using two different lecithin in water.

| | Example 6 | Example 9 |
|---|---|---|
| HLB of lecithin Used | 12 | 7 |
| Rate of Sedimentation (cm per hour) | 0.0 | 6.3 |

Note 1. The rate of sedimentation was measured as the rate of increase in the thickness of clear supernatant, and is reported in cm per hour. Greater values denote unstable suspension, hence inferring poor dispersibility.

TABLE 5

Comparison of dispersion time between red iron oxide in Example 6 and Example 9 in aqueous system (Note 1).

| | Joncryl 62 (Polar) | |
|---|---|---|
| | Example 6 | Example 9 |
| HLB Value of Lecithin | 12 | 7 |
| Dispersion Time (min) | 2 | 4 |

Note 1. Five grams of the pigment were added to 45 grams of a varnish. The mixture was stirred at 1500–1700 rpm using a high speed mixer (Premier Mixer Model 90) equipped with a 1.5 inches blade. The mixture was sampled at 1, 2, 3, and 5 minutes (except for yellow iron oxide) during the mixing process and tested in the 20 fineness of grind gauge (Hegman Gauge). The time of dispersion to reach a Hegman reading of 7 (meaning that there are no oversized, undispersed particles great than 12 microns) was reported.

EXAMPLE 10

Red iron oxide was encapsulated as in Example 6 except that encapsulants of various alkylphenol to lecithin ratio were used. The percentage of dinonylphenol in LP250 was 40%, 20%, 10% in Example 10a, 10b and 10c respectively. The sedimentation rates of these pigments in water was evaluated in accordance with Example 2.

TABLE 7

Sedimentation Rates of Red Iron Oxide Encapsulated with Various concentration of Dinonylphenol in LP 250 (Note 1.)

| | 6 | 10c | 10b | 10a |
|---|---|---|---|---|
| % of Dinoylphenol in LP250 | 5 | 10 | 20 | 40 |
| Sed. Rate (Note 1) | 0 | Note 2 | Note 2 | Note 2 |

Note 1. Sedimentation rates were measured in accordance to Example 2 and were reported in cm per hour.
Note 2. Thought there was no clearing in the supernatant (which referred to partial dispersion of particles), particles were observed to depositonto the bottom of the centrifugal tubes in all three cases. The rate of deposition was fastest in Example 10a, and slowest in Example 10c. In essence, these three pigments seemed to be not very dispersible in water.

As observed in Table 7, increasing the concentration of dinonylphenol to 10% or more may render the pigment so hydrophobic that it may not be readily dispersed in water (Note 2 in Table 7). Consequently, a percentage of less than 10% for alkylphenol may be appropriate for this pigment.

What is claimed is:

1. A method for preparing modified iron-containing pigment particles, said method comprising contacting a slurry of said pigment particles with an encapsulant comprising less than about 10 weight percent of an alkylphenol and about 80 to about 99.9 weight percent of a lecithin having an HLB value from about 10 to about 15.

2. The method of claim 1, wherein the encapsulant is present in an amount less than about 20% by weight of the pigment particles.

3. A method for preparing a pigment concentrate, comprising adding a vehicle to the modified iron-containing pigment particles prepared in accordance with claim 1.

4. The method of claim 3, wherein the vehicle is added in an amount sufficient to achieve a ratio of pigment particles to vehicle of about 2.6 or less by weight.

5. A method for preparing a pigment dispersion, comprising dispersing a concentrate prepared according to the method of claim 4 with one or more solvents.

6. A pigment dispersion, comprising:

(a) iron-containing pigment particles that have been contacted with an encapsulant comprising less than about 10 weight percent of an alkylphenol and about 80 to about 99.9 weight percent of a lecithin having an HLB value from about 10 to about 15 and (b) a vehicle.

7. An encapsulant comprising less than about 10 weight percent of an alkylphenol and about 80 to about 99.9 weight percent of a lecithin having an HLB value from about 10 to about 15.

* * * * *